United States Patent [19]

Fleck

[11] 4,421,212
[45] Dec. 20, 1983

[54] BRAKE CONTROL VALVE ARRANGEMENT

[75] Inventor: Franz Fleck, Frankfurt am Main, Fed. Rep. of Germany

[73] Assignee: ITT Industries, Inc., New York, N.Y.

[21] Appl. No.: 322,825

[22] Filed: Nov. 19, 1981

[30] Foreign Application Priority Data

Dec. 18, 1980 [DE] Fed. Rep. of Germany ....... 3047814

[51] Int. Cl.$^3$ ............................................. B60T 11/10
[52] U.S. Cl. .................................. 188/152; 188/290; 303/10
[58] Field of Search ....................................... 303/2–4, 303/1, 6 R, 6 A, 6 C, 10, 11, 12, 68, 69, 84 R, 84 A, 119, 50–56, 28, 29; 188/290–296, 357, 355, 358, 359, 360, 152; 60/548, 547 R, 555

[56] References Cited

U.S. PATENT DOCUMENTS

| | | | |
|---|---|---|---|
| 3,423,136 | 1/1969 | Lohbauer | 303/10 X |
| 3,901,562 | 8/1975 | Powell et al. | 303/1 X |
| 4,027,922 | 6/1977 | Schlicker | 303/6 R |
| 4,236,763 | 12/1980 | Resch | 303/6 R X |

*Primary Examiner*—Douglas C. Butler
*Attorney, Agent, or Firm*—James B. Raden; Marvin M. Chaban

[57] ABSTRACT

An arrangement for controlling the pressure of a hydraulic braking fluid supplied to a brake actuating cylinder includes an elongated hollow valve member mounted for axial movement in a bore of a housing. A compression spring acts on the valve member in one axial direction, and a control piston acts on the valve member in the opposite axial direction. Control pressure is admitted into an actuating compartment to act on the control piston and via the same on the valve member. The valve member forms a first valve arrangement with the control piston and a second valve arrangement with a part which is rigid with the housing. The first and second valve arrangement respectively controlled the communication of a slave unit with a low-pressure supply reservoir and with an actuating pressure source. The compression spring urges the valve member toward a position in which the first valve arrangement is open and the second valve arrangement is closed. An auxiliary spring acts on the compression spring via an auxiliary piston, a tappet and a transmission member, to augment the force of the compression spring. The control pressure is supplied upon brake actuation to the auxiliary piston to exert a hydraulic force thereon which reduces the auxiliary spring force which is transmitted to the compression spring. The sealing edge diameter of the second valve arrangement is greater than the sealing edge diameter of the first valve arrangement.

15 Claims, 3 Drawing Figures

BRAKE CONTROL VALVE ARRANGEMENT

BACKGROUND OF THE INVENTION

The present invention relates to brake control valve arrangements in general, and more particularly to an arrangement of this type which controls the pressure of a hydraulic fluid which is supplied from an actuating pressure source into a brake actuating cylinder in dependence on the pressure developed in a control pressure source in dependence on the position of a brake actuating member, such as a brake pedal.

There are already known various constructions of control valve arrangements of this type which control the hydraulic brake pressure of at least one wheel brake actuating cylinder in dependence on the control pressure which is developed, for instance, in a master cylinder of a vehicle braking system. The conventional arrangements of this type usually include a housing having ports communicating with a low-pressure supply reservoir, and an actuating pressure source, such as a pressure accumulator. In some of the conventional constructions, a control piston is accommodated in the interior of the housing and is acted on in one direction by the control pressure. Then, a hollow valve member is received in the interior of the housing in alignment with the control piston and in the aforementioned one direction therefrom. The end of the valve member which is closer to the control piston cooperates with the close end portion of the control piston to form a first valve device which, when opened, establishes communication through a first passageway from the wheel brake actuating cylinder port to the low-pressure supply reservoir port of the housing. The other end of the valve member cooperates with the housing or with a component which is rigid with the housing proper and constitutes housing means therewith, to constitute a second valve device. When the second valve device is open, it establishes communication through a second passageway leading from the actuating pressure port to the brake actuating cylinder port of the housing. A compression spring acts on the end of the valve member which is remote from the control piston in a direction toward the control piston and toward a position in which the second valve device is closed.

One construction of a control arrangement of this type is disclosed in German Pat. No. 1,232,827. This conventional arrangement includes, in addition to the pressure accumulator, another pressure source constituted by a hydraulic pump which is operative for feeding pressurized hydraulic fluid to the brake actuating cylinders, either in addition to, or instead of, the pressure accumulator. The control pressure for closing the first valve device in order to interrupt the communication of the brake actuating cylinders with the supply reservoir, and for opening the second valve device in order to establish communication between the control pressure source and the brake actuating cylinders, is applied in a mechanical manner.

A particular disadvantage of this particular brake control arrangement is that, when operated in the pressure accumulator mode, a larger amount of control pressure is required during the initial phase of the braking operation for opening the second valve device than during the subsequent phases. The requirement for the relatively high level of the control pressure during the initial phase of brake operation necessarily results from the relatively high closing force of the compression spring which urges the second valve device towards its closing position and which has to be overcome before any pressurized fluid from the actuating pressure source is allowed to flow to the brake actuating cylinders. Accordingly, it is necessary to apply a relatively high force to the brake actuating member during the initial phase of braking action in order to render the brake operative. This conveys to the driver of the vehicle equipped with a hydraulic braking system incorporating such a brake control arrangement the impression that the brake has failed. In many cases, the driver will react to this perceived brake failure by increasing the pressure on the brake pedal or a similar brake actuating member. This will result in an overcompensation for the perceived inadequate brake behavior, so that the braking action will be too pronounced after the expiration of the initial phase of the braking operation. This is disadvantageous especially when the vehicle is being maneuvered at the same time.

SUMMARY OF THE INVENTION

Accordingly, it is a general object of the present invention to avoid the disadvantageous of the prior art.

More particularly, it is an object of the present invention to provide an arrangement for controlling the pressure of hydraulic braking fluid supplied to brake actuating cylinders in dependence on the pressure developed in a control pressure source, which is not possessed of the disadvantages of the conventional control arrangements of this type.

A further object of the present invention is to so construct the control arrangement of the type here under consideration as to enable the driver of the vehicle to obtain a more direct response to the brake pedal depression than with the conventional control arrangements and, consequently, to brake the vehicle in a more direct and gradual manner.

It is still another object of the present invention to develop a control arrangement for use in a vehicle hydraulic braking system which is simple in construction, inexpensive to manufacture and reliable in operation nevertheless.

A concomitant object of the invention is so design the control arrangement of this type as to be able to easily rebuild already existing control arrangements to incorporate the features of the control arrangements of the present invention.

In pursuance of these objects and others which will become apparent hereafter, one feature of the present invention resides in an arrangement for controlling the pressure of hydraulic braking fluid supplied in dependence on the position of a brake actuating member, especially a brake pedal, to at least one brake actuating cylinder of a hydraulic braking system including a low-pressure supply reservoir, a control pressure source responsive to movement of the brake actuating member, and an actuating pressure source, this arrangement comprising a housing means having an internal bore and supply, control, pressure and relief ports communicating with the bore and, when the arrangement is incorporated in the braking system, with the brake actuating cylinder, the control pressure source, the actuating pressure source and the supply reservoir, respectively; an elongated hollow valve member received in the bore of the housing means for axial movement therein and having a first and a second end portion; a control piston axially movably received in the bore of the housing means at the first end portion of the valve member and having an end face which faces away from the valve member and delimits a control compartment communicating with the control port; first valve means rigid with the first end portion of the valve member and with the control piston for controlling the flow of hydraulic fluid between the supply and relief ports; second valve means rigid with the second end portion of the valve member and with the housing means for controlling the flow of hydraulic fluid between the actuating and supply ports; a compression spring acting on the second end of the valve member in a predetermind direction toward the control piston to urge the valve member toward an end position in which the first valve means is open and the second valve means is closed; and means for reducing the loading of the compression spring in proportion to the magnitude of the pressure supplied by the control pressure source into the control compartment. Advantageously, the reducing means includes means defining a chamber, an auxiliary piston received in the chamber for movement in opposite directions and having one end face delimiting an auxiliary compartment in the chamber, means for admitting pressurized fluid from the control pressure source into the auxiliary compartment to exert a reduction force proportionate to the pressure of the control pressure source on the one end face of the auxiliary piston and means for transmitting the reduction force from the auxiliary piston to the end of the compression spring which is remote from the valve member. It is particularly advantageous when the defining means is so situated relative to the housing means that the chamber is in alignment with the bore at the end of the compression spring which is remote from the valve member, and when the one end face of the auxiliary piston faces toward the compression spring.

A particular advantage of the above-discussed construction is that the compression spring can be so dimensioned and pre-stressed as to insure that the second valve means is reliably closed in the inactive or rest position of the valve member, so that no hydraulic fluid is allowed to flow from the pressure accumulator or similar actuating pressure source to the brake actuating cylinders. Nevertheless, it is possible to open the second valve means during the braking operation without the need for exerting an excessive hydraulic control pressure. This is attributable to the fact that the movement of the auxiliary piston in direction away from the valve member under the influence of the pressure from the control pressure source results in a reduction by a predetermined amount of the force with which the compression spring acts on the valve member. Thus, on application of a control pressure, which is proportionate to the force exerted by the driver on the brake pedal, the control arrangement of the hydraulic braking system will respond in a more direct and, consequently, more gradual manner than heretofore possible. The operator of the vehicle equipped with the hydraulic braking system incorporating the control arrangement according to the present invention does not get the impression of brake failure as soon after depressing the brake pedal as in the conventional braking system. This renders it less probable for the driver to react in the typical manner, that is, to depress the brake pedal with an increased force. Hence, cumulation of the unfavorable course of the characteristic response curve of the control arrangement and the unnecessarily increased control pressure does not occur.

In accordance with an advantageous further aspect of the present invention, an auxiliary spring is provided which extends between the end face of the auxiliary piston which faces away from the compression spring and the defining means and which urges the auxiliary piston in the aforementioned predetermined direction against the reduction force. This results in a situation where the force of the pressure derived from the control pressure source on the auxiliary piston acts against the force of the auxiliary spring on the auxiliary piston and, via the same, on the compression spring which acts on the valve member. Hence, the spring force which urges the valve member toward the position in which the second valve means is closed amounts to the sum of the forces of the compression spring and of the auxiliary spring in the absence of braking action. On the other hand, once the brake pedal is depressed, the pressure from the control pressure source on the auxiliary piston will counteract the force of the auxiliary spring to a gradually increasing degree, thus reducing the magnitude of the force transmitted from the auxiliary piston to the conpression spring until the transmission of such force is totally eliminated.

The requirement for tightness of the valve means of the valve member both during braking and in the absence of braking action is seemingly inimical to any reduction in the closing force acting on the valve member via the compression spring. However, in accordance with the present invention, this requirement for tightness, coupled with improved functional behavior of the control arrangement in operation, is satisfied in that the second end portion of the valve member has a diameter exceeding that of the first end portion and the diameter of the sealing edge of the second valve means which is associated with the actuating pressure source exceeds the diameter of the first valve means which is associated with the low-pressure supply reservoir. Advantageously, the sealing edge diameter of the second valve means exceeds that of the first valve means by about 10%. This expedient results in a situation where, as the brake pressure increases, the closing force acting on the first valve means due to the action of the brake pressure thereon also increases. This increasing pressure-related force, together with the gradually decreasing spring-related force, assures the tightness of the second valve means. In the open condition, in which the actuating pressure source is connected to the brake actuating cylinder, the pressure at the sealing edge of the first valve means is increased. On the other hand, in the closed condition, in which the actuating pressure source is separated from the brake actuating cylinder, the sealing edge pressure at the second valve means is increased. Moreover, the position of the valve member in the axial direction is advantageously no longer hydraulically indifferent; rather, it is stable. The force which acts on the valve member in its closing direction and which increases with the brake pressure increase results in an increasing hysteresis between the pressure build-up and pressure reduction.

In accordance with another, currently preferred, aspect of the present invention, the chamber accommodating the auxiliary piston is coaxially aligned with the bore accommodating the valve member, the housing means includes a guide member sealingly interposed between the bore and the chamber and having a central passage, and the transmitting means includes a transmission member bearing against the other end of the compression spring, and a tappet guided in the passage of the guide member and extending between the auxiliary piston and the transmission member. Advantageously, the tappet is rigid with one of the auxiliary piston and the transmission member, and the latter has a cut-shaped configuration.

In this context, it is particularly advantageous when the housing means includes an axial abutment effective for detaining the transmission member against excessive movement opposite to the predetermined direction, and the tappet has a dimension as considered in the predetermined direction which is shorter than the distance between the auxiliary piston and the transmission member when the auxiliary piston is fully displaced opposite to the predetermined direction, and the transmission member is detained by the abutment.

An advantageous construction is obtained when the tappet has an annular circumferential groove, and when means is provided for sealing the tappet in the passage of the guide member, this sealing means including an annual sealing element received in the groove of the tappet.

In an advantageous further development of the present invention, the defining means includes an auxiliary housing separate from the housing means and constituting with the auxiliary piston a reducing unit detachably connected to the housing means. Then, admitting means advantageously includes communicating duct sections in the housing means and in the auxiliary housing, of which the duct section in the housing means extends substantially parallel to the bore which accommodates the valve member. It is also advantageous when the admitting means further includes an additional duct section in the housing means which extends substantially radially and communicates with the control pressure source. This construction is particularly suited for use in retrofitting existing installations to embody the features of the present invention.

Finally, it is also advantageous when the control piston has a stepped configuration, and when the housing means has an additional port cooperating with the control piston and connected to a low-pressure conduit of the braking system, such as to a conduit of a hydrodynamic brake or retarder, or a venting conduit.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
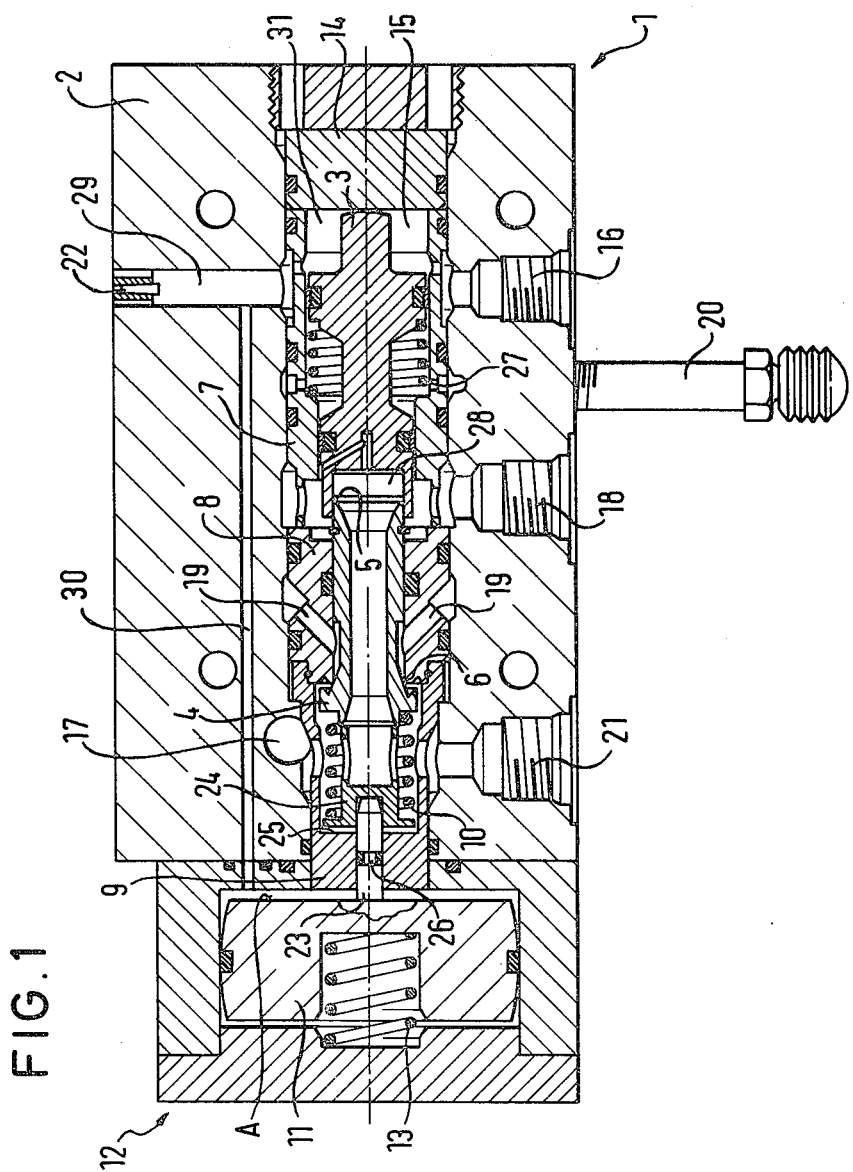
FIG. 1 is a longitudinal sectional view of a control arrangement in accordance with the present invention.

Referring now to the drawing in detail, and first to FIG. 1 thereof, it may be seen that the reference numeral 1 has been used therein to indicate a control arrangement in its entirety, while the reference numeral 12 identifies a force-reducing device or unit.

The control arrangement 1 proper includes a housing 2 which has a supply port 17 communicating with a slave device, such as a wheel brake actuating cylinder.

The housing 2 further includes a pressure port 19 which communicates with a pressure accumulator or a similar source of actuating pressure, a relief port 18 communicating with a low-pressure supply reservoir, and a control port 16 communicating with a control pressure source. The control pressure source includes, for instance, a master cylinder device of a hydraulic braking system of a motor vehicle, in which the control pressure varies in dependence on the position of a brake actuating member, for instance, a brake pedal. The actuating pressure source, the low-pressure reservoir, the control pressure source, and the slave unit are all of conventional constructions, as are the conduits which communicate the same with the control arrangement 1, so that all of these components of the hydraulic braking system have been omitted from the drawing in order not to unduly encumber the same.

The housing 2 of the control arrangement 1 further includes a port 21 for a pressure gage a port 22 for a checking device, and an additional port 20 which communicates for example, with a return conduit of a hydrodynamic brake or retarder or with a vent conduit. Inasmuch as the last-mentioned ports do not belong to the core of this invention, they will not be discussed in any more detail herein.

The housing 2 of the control arrangement 1 defines a stepped longitudinally extending through bore 15 which accommodates sleeve-shaped members or bushings 7,8 and 9 which are immovable in the axial direction of the housing 2 and form functionally integral housing means with the housing 2 proper. A control piston 3 is received in a first of the sleeve-shaped members or bushings 7, 8 and 9, that is, in a control piston bushing 7, for sliding in the axial direction. As illustrated in the drawing, the control piston 3 is constructed as a stepped combination control piston which may be connected to and cooperate with a return conduit of a hydrodynamic brake. A valve member 4 is axially movably received in a second or valve member mounting bushing 8, while the third bushing 9 is constructed as a guide which is rigid with the housing 2 and cooperates with a reducing cylinder unit 12. A screw plug 14 sealingly closes the longitudinal bore 15 of the housing 2 adjacent to a region of communication with the control port 16. The control piston 3 is equipped with a compression spring 27 which abuts against the bushing 7 and urges the control piston 3 toward contact with the screw plug 14.

The control piston 3 has, at its end remote from the plug 14, a socket-shaped portion which defines a recess facing toward the valve member 4. An armoring plate 28 which is made, for instance, of Vulkollan, is arranged at the bottom of the recess. The socket-shaped portion of the piston 3 has at least one slot, not shown, extending from the end face of the socket-shaped portion and terminate at or close to the leftward end face of the armoring plate 28 as considered in FIG. 1. The socket-shaped portion of the control piston 3, the armoring plate 28, and the right-hand end surface or sealing edge of the hollow valve member 4 to form first valve means 5. Second valve means 6 is constituted by an end surface of the bushing 8 and a conical left-hand end portion or sealing edge of the valve member 4.

A compression spring 10 is provided which extends between and acts on the the valve member 4, on the one hand, and a socket-shaped transmission member 24, on the other hand. The bushing or guide 9 has an end face 25 which acts as an axial stop for the transmission member 24.

The transmission member 24 has a coaxial bore shaped as a blind hole adapted to receive a guide tappet 23 of the auxiliary piston 11 of the reducing cylinder unit 12. At its rear end, that is, at its end which faces away from the housing 2 and from the compression spring 10, the piston 11 of the reducing cylinder unit 12 has a recess which receives an auxiliary spring 13. The auxiliary spring 13 bears against the outer housing wall of the reducing cylinder unit 12, that is, against the left-hand wall as considered in the drawing.

The guide tappet 23 is shown to be integrally formed with the piston 11 of the reducing cylinder unit 12. It has a reduced-diameter central section 26 which receives a sealing ring. The guide tappet 23 is thus guided in the guiding member or bushing 9 in a reliable and hydraulically sealed manner.

The arrangement 12 is so designed that, in the inactive condition of the braking circuit incorporating the same, that is, when no control pressure is supplied to the control port 16, the force of the spring 27 moves the control piston 3 into engagement with the screw plug 14, that is, into the position illustrated in FIG. 1. Furthermore, the forces of the auxiliary spring 13 and of the compression spring 10 maintain the valve member 4 in its illustrated position in which the second valve means 6 is closed. At this time, the springs 10 and 13 exert predetermined force on the valve member 4. Under these circumstances, the auxiliary piston 11 of the reducing cylinder unit 12 assumes the position illustrated in the drawing. Also, the front end of the guide tappet 23 is in abutment with the bottom of the associated blind bore of the transmission member 24, so that the entire force of the auxiliary spring 13 is transmitted via the auxiliary piston 11, the guide tappet 23 and the transmission member 24 to the compression spring 10 to be superimposed on the inherent spring force of the latter.

In this initial position, in which no braking action occurs, the first valve means 5 is open, so that communication is established through a passageway which connects the supply port 17 through the interior of the hollow valve member 4 with the return port 18 and, via the latter, with the low-pressure hydraulic supply reservoir which is omitted from the drawing.

In the illustrated embodiment of the present invention, the sealing edge diameter of the second valve means 6, which serves to interrupt a flow in a passageway from the actuating pressure port 19 to the supply port 17 in the inactive condition of the braking system and which establishes communication through this passage once the braking system becomes active due to brake pedal depression, is greater than the sealing edge diameter of the first valve means 5 which is interposed between the supply port 17 and the return or relief port 18. In an advantageous construction of the arrangement 1, the sealing edge diameter of the second valve means 6 is 12 mm and the sealing edge diameter of the first valve means is 11 mm. In this particular construction, the springs 13 and 10 are so arranged as to exert spring closure force of about 16.5 kg on the valve member 4 to close the second valve means 6 in the inactive condition of the braking system. On the other hand, when the compression spring 10 is relieved, that is, when the transmission member 24 is in abutment with the axial stop 25 of the bushing 9, a reduced spring closure force of about 2 kg acts on the valve member 4.

A hydraulic conduit 30 constituted by a longitudinally extending bore in the housing 2, and a radial bore 29, connect the reducing cylinder unit 12 with an actuating compartment 31 of the control piston 3. The actuating compartment 31 is, in turn, connected to the control pressure port 16 to which control pressure $p_A$ is supplied from the control pressure source.

Having so described the construction of the control arrangement 1 of the present invention, the mode of operation thereof will now be explained.

When braking action is to be performed, a brake pedal is depressed, which results in an increase in the control pressure $p_A$ in the control pressure source, such as a master cylinder device. This increased control pressure $p_A$ is supplied through the control pressure port 16 into the actuating compartment 31 to act on the control piston 3, and also, through the radial bore 29 and the longitudinal conduit 30, into the reducing cylinder unit 12 to act on the auxiliary piston 11. More particularly, the control pressure $p_A$ acts on an annular surface A of the auxiliary piston 11 to exert a hydraulic force on the auxiliary piston 11 of the reducing cylinder unit 12 which is opposed to the force of the auxiliary spring 13. In the above-discussed construction, the area of the annular surface A is approximately 19.4 cm$^2$, resulting in a value of the hydraulic opposing force of about 14.5 kg. This hydraulic force linearly increases with the increase of the control pressure $p_A$. Inasmuch as this hydraulic force opposes the force of the auxiliary spring 13, the magnitude of the closing force which is transmitted by the guide tappet 23 to the transmission member 24 and thus to the compression spring 10 diminishes with the increasing value of control pressure $p_A$, until it reaches zero when the control pressure $p_A$ equals approximately 0.74 bar in the above-discussed construction. As the control pressure $p_A$ continues to rise beyond this value, the auxiliary piston 11 is displaced in the leftward direction as considered in FIG. 1, which permits the transmission member 24 to move in the leftward direction as well. Thus, only the force of the compression spring 10, amounting to approximately to 2 kg, acts on the valve member 4 in the closing direction of the second valve means 6 under these circumstances. Simultaneously therewith, the increase in the control pressure $p_A$ causes the control piston 3 to move in the leftward direction as considered in FIG. 1, against the force of the compression spring 27. In the concrete embodiment of the present invention, the hydraulic force acting on the control piston 3 in the leftward direction amounts to approximately 2.55 kg. This hydraulic force is sufficient not only to overcome the force of the compression spring 27, but also to move the second valve means 5 of the valve member 4 into, and securely hold in the same in, the closing position thereof. Thus, communication between the supply port 17 and the return port 18 is interrupted by the first valve means 5.

As the control pressure $p_A$ rises further, up to about 2 to 3 bar in the above-mentioned concrete embodiment, the second valve means 6 of the valve member 4 is opened against the opposition of the force of the compression spring 10 and the respective frictional forces. In this manner, there is established communication between the actuating pressure port 19 and the supply port 17 past the sealing edge of the second valve means 6.

During still further increase in the control pressure $p_A$, hydraulic fluid will flow from the actuating pressure source, such as a pressure accumulator, to the brake actuating cylinder until the supplied pressure has reached a magnitude amounting to about 3 times the control pressure. In view of the fact that the sealing edge diameter of the second valve means 6 is greater than the sealing edge diameter of the first valve means 5 the desired tightness of the control arrangement 1 is obtained under all circumstances, that is, even in the braking condition. In the open condition of the second valve means 6, the sealing pressure at the closed first valve means 5 is increased. On the other hand, in the closed condition of the second valve means 6 in which the actuating pressure source is separated from the supply port 17, the sealing edge pressure at this second valve means 6 is increased. Consequently, the valve member 4 is subjected to a force which acts in the closing direction of the valve member 4, that is, to the right, as considered in FIG. 1, this force increasing as the brake pressure increases.

On termination of the braking action, the control pressure $p_A$ decreases to zero. Thus, the hydraulic force acting on the valve member 4 also decreases to zero. At the same time, commencing approximately at the control pressure $p_A = 0.85$ bar in the concrete embodiment, the magnitude of the force of the auxiliary spring 13 which is transmitted to the compression spring 10 is again increased, such as to 16.5 kg in the concrete embodiment.

Figure 2:
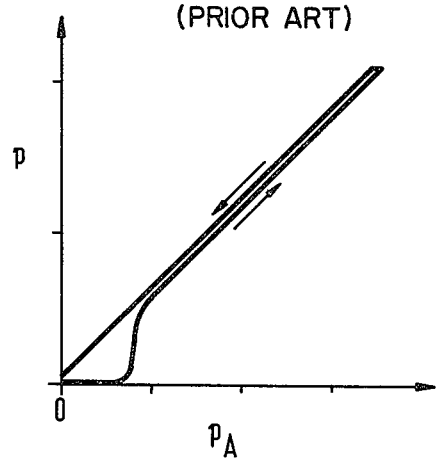
FIG. 2 is a graphic representation of a characteristic behavior curve of a conventional control arrangement during normal brake operation.
Figure 3:
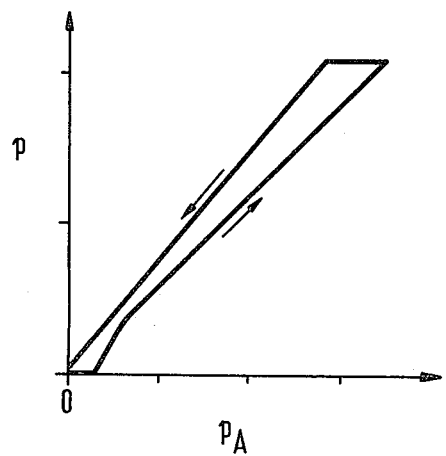
FIG. 3 is a view similar to that of FIG. 2 but showing a characteristic behavior curve of the control arrangement of the present invention.

The response of the control arrangement 1 of the present invention, as compared with that of above-discussed conventional control arrangement to changing pressure conditions, will best be understood upon comparing FIGS. 2 and 3. FIG. 2 illustrates the response of the conventional control arrangement, whereas the diagram of FIG. 3 represents the response or characteristic behavior of the control arrangement 1 of the present invention which includes the reducing cylinder unit 12. As a comparison of these two diagrams will show, the response of the control arrangement 1 of this invention to the control pressure $p_A$ or pedal force is more direct than in the conventional control arrangement. This permits a more direct and more gradual braking action at least in the region of the low control pressure $p_A$. FIG. 3 shows that the slave unit, such as a wheel brake actuating cylinder, can be supplied with hydraulic braking fluid already at the control pressure of $p_A = 2$ to 3 bar.

The reducing cylinder 12 of FIG. 1 is particularly suited for use in conjunction with already existing control arrangements, particularly in view of the fact that it is constructed as a self-contained unit which can be affixed in any known manner to the housing 2 of the control arrangement 1. Only slight modifications like the provision of the hydraulic conduit 13 in the housing 2, of the bushing 9 and of the transmission member 24, coupled with the attachment of the unit 12 to the housing 2, will retrofit the existing control arrangement to incorporate the features of the present invention.

While I have described above the principles of my invention in connection with specific apparatus, it is to be clearly understood that this description is made only by way of example and not as a limitation to the scope of my invention as set forth in the accompanying claims.

I claim:

1. An arrangement for controlling the pressure of hydraulic braking fluid supplied in dependence on the position of a brake actuating member, especially a brake pedal, to at least one brake actuating cylinder of a hydraulic braking system including a low-pressure supply reservoir, a control pressure source responsive to movement of the brake actuating member, and an actuating pressure source, comprising housing means having an internal bore and supply, control, pressure and relief ports communicating with said bore and, when the arrangement is incorporated in the braking system, with the brake actuating cylinder, the control pressure source, the actuating pressure source, and the supply reservoir, respectively; an elongated hollow valve member received in said bore for axial movement therein and having a first and a second end portion; a control piston axially movably received in said bore at said first end portion of said valve member and having an end face which faces away from said valve member and delimits a control compartment communicating with said control port; first valve means rigid with said first end portion of said valve member and with said control piston for controlling the flow of hydraulic fluid between said supply and relief ports; second valve means rigid with said second end portion of said valve member and with said housing means for controlling the flow of hydraulic fluid between said actuating and supply ports; a compression spring acting on said second end of said valve member in a predetermined direction toward said control piston to urge said valve member toward an end position in which said first valve means is open and said second valve means is closed; and means for reducing the loading of said compression spring in proportion to the magnitude of the pressure supplied by the control pressure source into said control compartment.

2. The arrangement as defined in claim 1, wherein said compression spring has two ends one of which bears against said valve member; and wherein said reducing means includes means defining a chamber, an auxiliary piston received in said chamber for movement in opposite directions and having one end face delimiting an auxiliary compartment in said chamber, means for admitting pressurized fluid from said control pressure source into said auxiliary compartment to exert a reduction force proportionate to the pressure of the control pressure source on said one end face of said auxiliary piston; and means for transmitting said reduction force from said auxiliary piston to the other end of said compression spring.

3. The arrangement as defined in claim 2, wherein said defining means is so situated relative to said housing means that said chamber is in alignment with said bore at said other end of said compression spring; and wherein said one end face of said auxiliary piston faces toward said other end of said compression spring.

4. The arrangement as defined in claim 3, wherein said auxiliary piston has another face facing away from said compression spring; and further comprising an auxiliary spring extending between said other end face of said auxiliary piston and said defining means and urging said auxiliary piston in said predetermined direction against said reduction force.

5. The arrangement as defined in claim 3, wherein said chamber is coaxially aligned with said bore; wherein said housing means includes a guide member sealingly interposed between said bore and said chamber and having a central passage; and wherein said transmitting means includes a transmission member bearing against said other end of said compression spring and a tappet guided in said passage of said guide member and extending between said auxiliary piston and said transmission member.

6. The arrangement as defined in claim 5, wherein said transmission member has a cup-shaped configuration.

7. The arrangement as defined in claim 5, wherein said tappet is rigid with one of said auxiliary piston and transmission member.

8. The arrangement as defined in claim 5, wherein said housing means includes an axial abutment effective for retaining said transmission member against excessive movement opposite to said predetermined direction; and wherein said tappet has a dimension as considered in said predetermined direction which is shorter than the distance between said auxiliary piston and said transmission member when the auxiliary piston is fully displaced opposite to said predetermined direction and said transmission member is detained by said abutment.

9. The arrangement as defined in claim 5, wherein said tappet has an annular circumferential groove; and further comprising means for sealing said tappet in said passage, including an annular sealing element received in said groove.

10. The arrangement as defined in claim 3, wherein said defining means includes an auxiliary housing separate from said housing means and constituting with said auxiliary piston a reducing unit detachably connected to said housing means, and wherein said admitting means includes communicating duct sections in said housing means and in said auxiliary housing, of which the duct section in said housing means extends substantially parallel to said bore.

11. The arrangement as defined in claim 10, wherein said admitting means further includes an additional duct section in said housing means which extends substantially radially and communicates with the control pressure source.

12. The arrangement as defined in claim 1, wherein said second end portion of said valve member has a diameter exceeding that of said first end portion.

13. The arrangement as defined in claim 12, wherein said first and second valve means have respective sealing edges; and wherein the diameter of said sealing edge of said second valve means exceeds that of said sealing edge of said first valve means.

14. The arrangement as defined in claim 13, wherein the difference between said diameters of said sealing edges amounts to about 10%.

15. The arrangement as defined in claim 1, wherein said control piston has a stepped configuration; and wherein said housing means has an additional port cooperating with said control piston and connected to a low-pressure conduit of the braking system.

* * * * *